United States Patent [19]

Andonian

[11] Patent Number: 4,967,934
[45] Date of Patent: Nov. 6, 1990

[54] PACK OF HIGH PRESSURE GAS CONTAINERS

[76] Inventor: Martin D. Andonian, Fairbanks Rd., Lexington, Mass. 02173

[21] Appl. No.: 203,325

[22] Filed: Jun. 7, 1988

[51] Int. Cl.$^5$ ................................................. F17C 1/00
[52] U.S. Cl. ...................................... 222/3; 137/266; 137/382.5; 251/292
[58] Field of Search ............. 222/3, 6, 129, 145, 222/608, 173, 182, 143; 137/255, 258–259, 266, 377, 382, 382.5, 602, 605; 251/292; 220/85 P, 3

[56] References Cited

U.S. PATENT DOCUMENTS

| | | | |
|---|---|---|---|
| 2,011,347 | 8/1935 | Ragonnet | 222/143 |
| 2,380,956 | 8/1945 | Evarts | 137/266 X |
| 2,518,569 | 8/1950 | Pierson | 137/602 X |
| 2,547,823 | 4/1951 | Josephian | 137/266 X |
| 3,040,767 | 6/1962 | Quenard | 137/266 X |
| 3,453,655 | 7/1969 | Quinones et al. | 137/382.5 X |
| 3,976,227 | 8/1976 | Ray | 222/145 X |
| 4,606,367 | 8/1986 | Britt | 137/15 |
| 4,682,627 | 7/1987 | Cooper et al. | 137/572 |
| 4,834,137 | 5/1989 | Kawaguchi et al. | 137/557 |

FOREIGN PATENT DOCUMENTS 143325  5/1935  Austria ............................ 137/382.5

Primary Examiner—Michael S. Huppert
Attorney, Agent, or Firm—Robert T. Dunn

[57] ABSTRACT

Several high pressure gas cylinders are attached together in a pack, each container having a valve at one end that controls flow of gas from the cylinder and each valve having a removable valve control handle, the cylinders being arranged coextensive and contiguous in the pack with all cylinder valves at the same end of the pack, a gas manifold at that end of the pack having a gas input for each cylinder and a gas output for feeding gas to a utilization device, a gas line from each cylinder valve to one of the manifold inputs and a manifold valve at the manifold output, so arranged that the manifold valve controls gas flow from the pack of cylinders to the utilization device and the cylinder valves control gas flow from each cylinders to the utilization device. In a preferred embodiment, a protective valve cap is provided for each cylinder valve secured to the cylinder and the valve control handle therefor is removable from and attachable to the valve without removing the cap, whereby all cylinder valve control handles in the pack can be removed and the valves are at all times protected by the caps, even while the pack provides gas to the utilization device, and so damage to the valves and/or tampering with the valves is prevented.

10 Claims, 3 Drawing Sheets

PACK OF HIGH PRESSURE GAS CONTAINERS

BACKGROUND OF THE INVENTION

This invention relates to high pressure gas containers and the interconnecting gas lines and control valves between several such containers providing gas to a utilization device. More particularly, the invention relates to a nest or pack of such containers and the gas flow lines and valves between the containers of the pack where the containers are identical, conventional, cylindrical containers each having a valve at one end thereof.

Heretofore, conventional cylindrical high pressure gas containers have been connected in parallel to a manifold control that feeds the gas from the cylinders to a utilization device. Most often, the gas cylinders are installed one at a time and connected together in situs at the location of the utilization device. For example, emergency gas supplies including a number of 300 cubic feet or 75 pound capacity high pressure gas cylinders are provided at a utilization device and stand by to maintain operation of the device in an emergency when other power and/or gas sources fail. Such emergency installations are sometimes provided: for refrigeration systems where the cylinders contain $CO_2$ that typically can maintain low temperatures for a few days in case of failure of a mechanical refrigeration; to supply $CO_2$ gas to an incubator; to supply oxygen in nursing homes, hospitals and such; to supply compressed air for ventilators and other life support equipment; to supply hydrogen or helium or other gases that cannot easily be liquified; to provide a source for filling smaller gas cylinders for any of the above uses; and to supply nitrogen for running autoclaves and Joule-Thompson types of refrigerators. In all the above mentioned applications and others, each high pressure gas cylinder contains a valve at one end that is completely covered by a protective cap to prevent damage to the valve during use, shipping, etc. and to prevent tampering and inadvertent opening. When the cylinder is used, the cap is removed to provide access to the valve and sometimes the caps are lost, or at least the caps are not put back on and so the valve is then subject to damage and tampering.

As mentioned above, usually, arrangements of high pressure gas cylinders for any of the above uses and others are installed in situs and connected together in situs, sometimes with a common manifold and sometimes without and with individual gas lines running from the cylinders to a utilization device. With such arrangements, container valves may be left uncapped and so are exposed to damage and/or tampering. Where the tanks provide primary or emergency life support, such as oxygen in a hospital, such damage and/or tampering could risk lives.

SUMMARY OF THE INVENTION

It is an object of the present invention to provide a high pressure gas container and gas flow control valve with a protective cap for the valve attached to the container, adapted so that the valve can be operated without removing the protective cap.

It is another object of the present invention to provide a pack of high pressure gas containers, preferably using conventional gas cylinders, wherein the disadvantages and problems with prior gas supplies, such as those mentioned above, are avoided.

It is another object to provide a pack of high pressure gas containers such as gas cylinders having protective caps on all valves, wherein the pack can be used to provide the gas to utilization devices and the cylinder valves can be operated even while all protective caps remain attached to protect the associated tank valves.

It is another object to provide a nest or pack of high pressure gas containers in a rigid assembly of the containers including all container valves, manifolds, gas flow line connections between the containers and manifold and protective caps on all valves, whereby the rigid pack is readily manually moveable to a utilization device or system input and can be put in primary or emergency service to the utilization system by connecting the utilization system to the manifold.

According to one feature of the present invention, a conventional gas container with a gas flow control valve attached is provided with a protective valve cap secured to the container and the valve control handle is removeable from and attachable to the valve without removing the cap so that the handle can be removed and stored even while the container provides gas to the utilization device, and so damage to the valve and/or tampering with the valve is prevented.

According to another feature of the embodiment of the present invention described herein, several high pressure gas containers are attached together in a pack, each container having a valve attached to the container that controls flow of gas from the container and each container valve having a removeable valve control handle. The containers being arranged in the pack with all container valves at the same end of the pack and a gas manifold at that end of the pack having a plurality of gas inputs and a gas output for feeding gas from the containers to a utilization device. A gas conduit (gas line) is provided from each container valve to one of the manifold gas inputs and a manifold valve at the manifold gas output are so connected that the manifold valve controls gas flow from the pack of containers to the utilization device and the container valves control gas flow from the associated container to the utilization device.

In a preferred form of this embodiment, a protective valve cap is provided for each container valve, secured to the associated container, and the valve control handle for the valve is removeable from and attachable to the valve without removing the cap, whereby all container valve control handles in the pack can be removed and the valves are at all times protected by the caps, even while the pack provides gas to the utilization device, and so damage to the valves and/or tampering with the valves is prevented.

In an embodiment of the invention incorporating all of the above features, the gas containers are conventional high pressure gas cylinders each having: an outlet valve at one end with a removeable handle to the valve; a protective cap enclosing the valve and attached to the tank whereby the handle can be removed from the valve and installed in the valve without removing the protective cap; and the tanks are arranged with longitudinal axis parallel, side by side, each tank abutting other tanks of the pack and strapped together in this fashion to provide a rigid pack of tanks all with their valves at the same end of the pack. For convenience in moving the pack and to elevate the pack from the floor, caster wheels are provided at the other end of the pack. A manifold is provided at the valve end of the pack having a plurality of gas inputs and a gas output for connection to the utilization device, and an output valve for the manifold is provided having a protective cap and a removeable valve control handle and the valve control handles for all valves at the one end of the pack are interchangeable.

These and other objects and features of embodiments of the invention are apparent from the drawings and the following specific description of the embodiments.

DESCRIPTION OF EMBODIMENTS OF THE INVENTION

Figure 1:
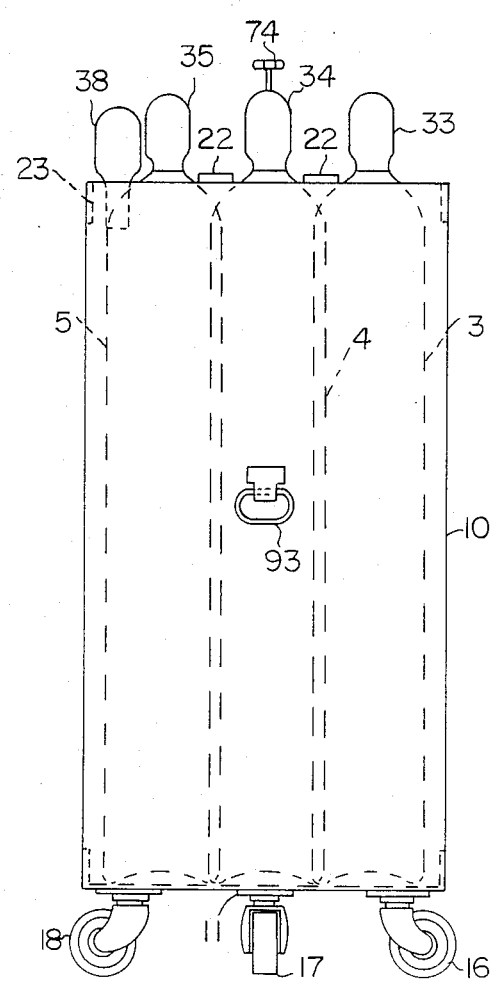
FIGS. 1, 2, and 3 are front, top and bottom views, respectively, of a pack of high pressured gas containers incorporating features of the present invention.
Figure 2:
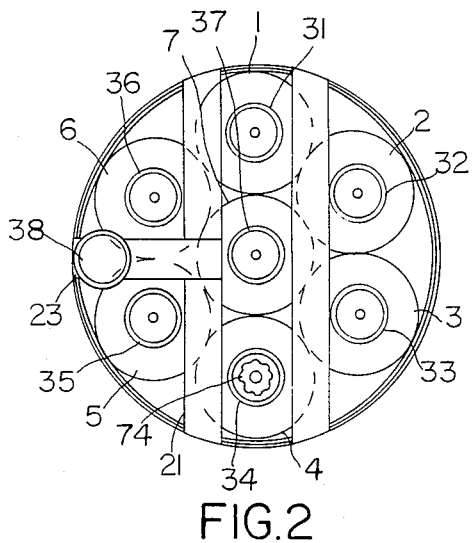
Figure 3:
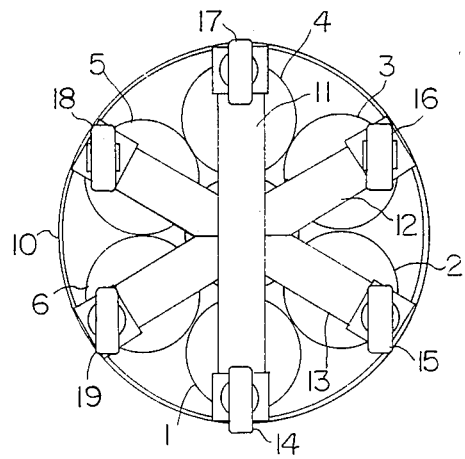

Turning first to FIGS. 1, 2 and 3 there is shown seven conventional high pressure cylindrical gas tanks (containers) 1 to 7 arranged side by side with all of their cylinder axes parallel and each container immediately contiguous with at least three other containers of the pack and one container at the center contiguous with all of the other containers of the pack. The gas cylinders 1 to 7 are so arranged inside a stainless steel outer casing 10 that may itself be a cylinder and the tolerances are such that any one of the tanks can be removed from the pack and replaced by another tank by simply lifting the tank out of the top of the casing. At the bottom of the casing shown in FIG. 3, an assembly of radial support members 11 to 13 provide a support for the tanks at the bottom of the casing and are attached to the casing as shown to provide rigidity thereto. These radial support members also carry caster wheels 14 to 19 so that the pack is raised off the floor for ventilation and can roll on the caster wheels to facilitate manually moving it from place to place.

At the top end of the casing 10, top end plates 21 and 22 across the top end and between the ends of the tanks give rigidity to the top end of the casing and support the manifold mounting plate 23 that carries the manifold At the top of the pack, as shown in FIGS. 1 and 2, the output ends (the valve ends) of tanks 1 to 7 project slightly from the top of the casing and all valves are capped by protective caps 31 to 37, respectively, that extend from the top end between and around the plates 21 and 22 and within each cap is the tank control valve. Also, projecting from the top of the tank, from the manifold mounting plate 23 is the manifold control valve protective cap 38; and so a cluster of caps 31 to 38, one for each tank and one for the manifold valve all project from the top end of the pack.

Figure 4:
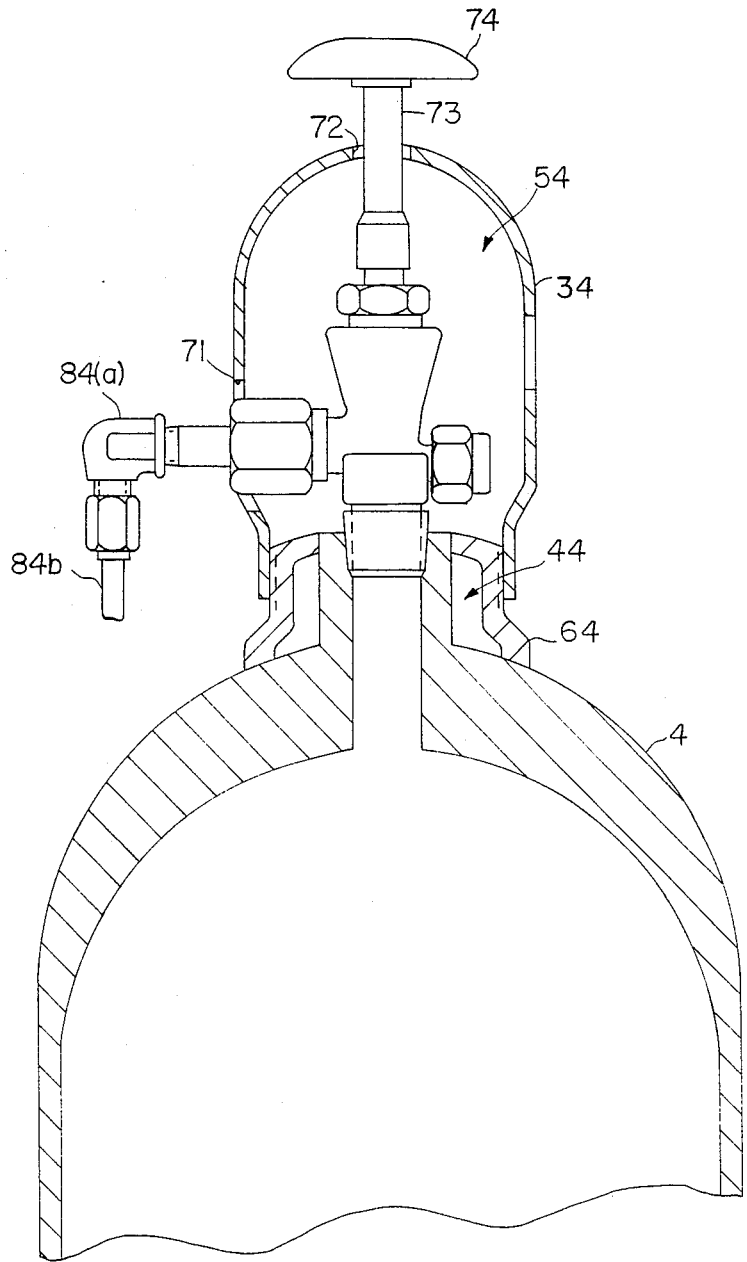
FIG. 4 is an enlarged cross section elevation view of the valve end of one the high pressure gas tanks showing the control valve attached thereto, the protective cap enclosing the control valve and attached to the tank, and the removeable valve handle that can be removed from the valve and attached to the valve without removing the cap.

One of the tank valve caps and removeable valve handle, all mounted to the top of a tank is shown in FIG. 4 with the tank and cap broken away to reveal the valve enclosed by the cap. As shown, the tank, such as tank 4, is a conventional high pressure cylindrical gas tank, reinforced at the concave end where a threaded axial opening 44 accommodates the tank valve 54 by internal threads in the opening. External threads around the opening are provided by a conventional boss 64 that is usually fixedly attached to the end of the tank and accommodates attachment of the valve cap 34 by screwing the cap onto the boss. An opening 71 in the side of the cap is for attachment and passage of a high pressure gas line connector 84 that connects the valve output to the tank output high pressure gas line 84b. At the top of the cap another opening 72 provides clearance for insertion of the stem 73 of the valve control handle 74 so that the handle is accessible outside of the cap and the handle can be removed from the valve without removing the cap.

All of the tanks may be constructed as shown in FIG. 4 each having a valve, a protective cap on the valve, an output fitting from the valve output and a high pressure gas line from the fitting. In a preferred embodiment, a single valve handle and stem can be used on all valves and so only one such handle need be provided for the pack of tanks.

Figure 5:
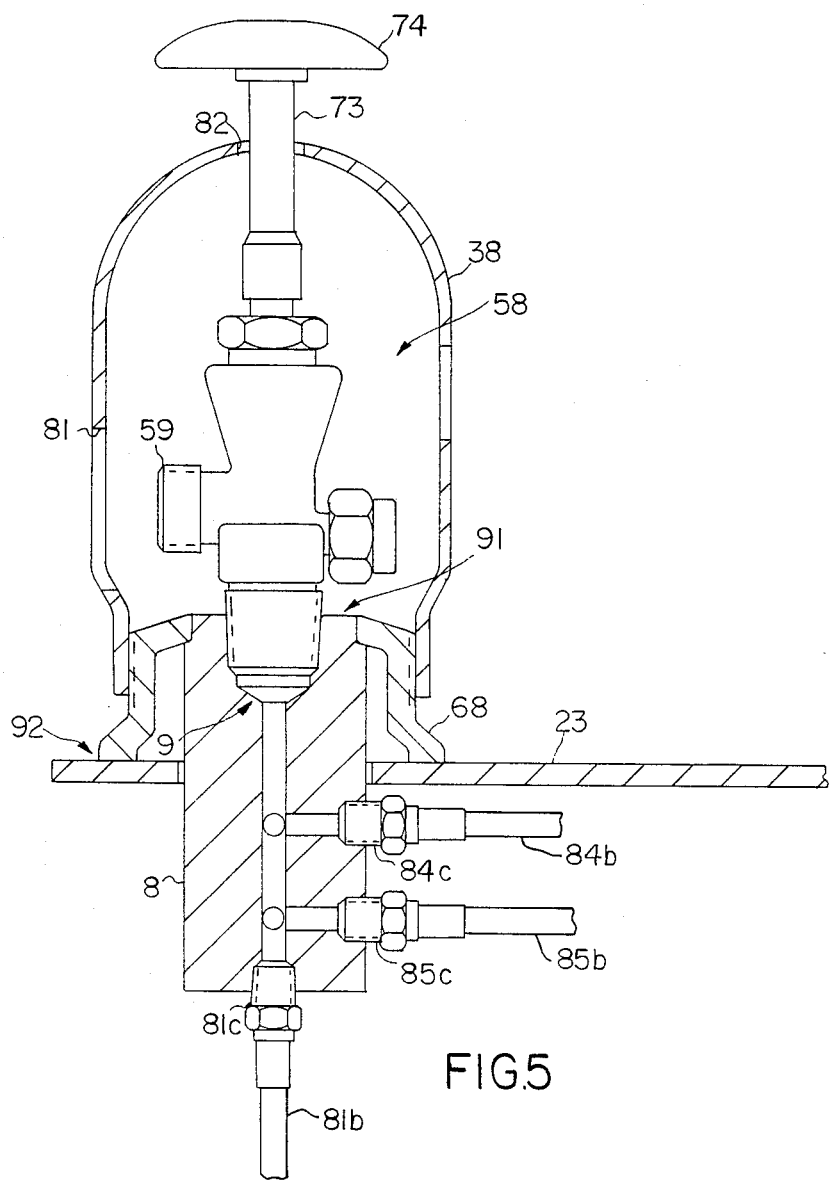
FIG. 5 is a cross section elevation view of the manifold showing the input connections, output connection, the manifold valve and mounting plate and protective cap and removeable valve control handle.

The manifold, manifold valve, cap and manifold valve control handle assembly is shown in FIG. 5. Here, the cap, manifold, and manifold mounting plate are shown broken away to reveal the parts and function thereof. The manifold 8 is mounted to plate 23 using a boss 68, like boss 64, so that the manifold valve cap 38 can be attached by screwing onto the boss and encloses the manifold valve 58 that is screwed into a threaded output 9 from the manifold. The inputs to the manifold are seven in number, one from each tank, and accommodated by fittings 81c to 87c to which are connected high pressure hoses 81b to 87b, respectively. Thus, each of the tank output high pressure hoses connects to one of the manifold inputs. All gas from the manifold flows through the manifold valve 58 to the manifold valve output 59 to which a suitable high pressure gas fitting may be attached accommodating a high pressure gas line to a utilization device (not shown). For attachment and passage of that gas line fitting to valve output 59, an opening 81 is provided in the manifold valve cap 38. Another opening 82 is provided in the manifold cap to accommodate inserting the stem 73 of manifold control valve handle 74 for attaching and removing the control handle to the manifold valve without removing the manifold valve cap.

All high pressure hoses 81b to 87b from the tank valves to the manifold inputs are preferably contained within the casing 10 beneath plates 21, 22 and 23 and so these high pressure hoses feed to the manifold below plate 23. For that purpose, the manifold 8 is mounted to plate 23 as shown in FIG. 5 with the inputs of the manifold being accessible below the plate. The manifold is held in place in this manner by suitable attachment at 91 to boss 68, which may be welded to plate 23 at 92.

The complete pack of tanks, as shown in FIGS. 1 to 3, is readily moveable on casters 14 to 19 and may have handles, such as 93, on the outside of the casing to facilitate manually pushing or pulling the pack along a floor. The top of the pack, shown in FIG. 2, shows only the protective caps for the individual tanks of the pack and the manifold cap. A single control valve handle 74 is provided for all of the tank valves and the manifold valve and can be stored on one of the valves as shown in the figures, or it may be stored by attaching to a clip on one of the plates on top of the pack. The complete assembly of the pack shown in these figures with all valve caps attached and the valve control handle stored and all high pressure gas lines from the tanks to the manifold extending beneath the plates at the top of the casing, is less subject to inadvertent damage and intentional tampering than equivalent facilities provided in the past and yet is just as accessible for operation as those facilities. The embodiment described herein represents the best known use of the invention and its features. However, it should be clearly understood that those features may be used in other equipments by those skilled in the art, with some variation, without departing from the spirit and scope of the invention as set forth in the appended claims.

What is claimed is:

1. A pack of high pressure gas containers comprising,
   (a) three or more high pressure gas containers each having an output end, in a contiguous arrangement of said containers that provides access to the output end of all the containers at one side of said pack,
   (b) means holding said containers together in said pack,
   (c) a container valve at said output end of each container that controls the flow of gas from the container,
   (d) a protective cap enclosing each container valve and attached to the corresponding container,
   (e) said container valves are each adapted for accommodating a removable valve control handle,
   (f) a gas manifold at said one side of said pack having a plurality of gas inputs and a gas output,
   (g) a gas conduit from each of said container valves to one of said manifold inputs and
   (h) a manifold valve connected to said manifold output for feeding gas from said manifold to a utilization device, and
   (e) said container valves and container valve caps are adapted so that each of said container control valve handles can be attached to and removed from said container valves without removing said cap from said container thereof,
   (g) whereby, in operation, said manifold valve controls gas flow from said pack of containers to said utilization device and said container valves control gas flow from the associated container to said utilization device and said container valve handles are readily removable and such removable does not interfer with said operation.

2. A pack of high pressure gas containers as in claim 1 wherein,
   (a) said manifold valve is enclosed by a protective cap,
   (b) said manifold valve is adapted to accommodate a removeable valve control handle and
   (c) said manifold valve, manifold valve cap and manifold valve control handle are adapted so that said manifold valve control handle can be attached to and removed from said manifold valve without removing said manifold cap therefrom.

3. A pack of high pressure gas containers as in claim 1 wherein one or more of said container valve control handles are provided that can be used on more than one of said valves.

4. A pack of high pressure gas containers as in claim 3 wherein one or more of said valve control handles can be used on all of said container valves.

5. A pack of high pressure gas containers as in claim 3 wherein one or more of said valve control handles can be used on all of said container valves and on said manifold valve.

6. A pack of high pressure gas containers as in claim 1 wherein
   (a) said manifold valve is enclosed by a protective cap,
   (b) said manifold valve is adapted to accommodate a removeable valve control handle and
   (c) said manifold valve, manifold valve cap and manifold valve control handle are adapted so that said manifold valve control handle can be attached to and removed from said manifold valve without removing said manifold cap therefrom.

7. A pack of high pressure gas containers as in claim 6 wherein one or more of said container and manifold valve control handles can be used on all of said container valves and said manifold valve.

8. A pack of high pressure gas containers comprising,
   (a) three or more high pressure gas containers,
   (b) means for holding said gas containers together forming a pack of said containers in which said containers are along side each other in said pack,
   (c) a container valve on each container in said pack that controls the flow of gas from the container,
   (d) a protective cap enclosing each container valve and attached to the corresponding container,
   (e) said container valves are each adapted for accommodating a removable valve control handle,
   (f) a gas manifold on said pack having a plurality of gas inputs and a gas output that feeds gas from said pack to a utilization device,
   (g) a gas line from each container valve to one of said manifold inputs and
   (h) a manifold valve at said manifold output,
   (i) said container valves and container valve caps are adapted so that each of said container control valve handles can be attached to and removed from said container valves without removing said cap from said container thereof,
   (i) whereby, in operation, said manifold valve controls gas flow from said pack to said utilization valve and said container valves control gas flow from the associated container to said manifold and such removal does not interfer with said operation.

9. A pack of high pressure gas containers as in claim 8 wherein,
   (a) said manifold valve is enclosed by a protective cap that attaches to said manifold,
   (b) said manifold valve has a removeable control handle and
   (c) said manifold valve, manifold valve cap and manifold valve control handle are adapted so that said manifold valve control handle can be attached and removed from said manifold valve without removing said manifold valve cap from said manifold.

10. A pack of high pressure gas containers as in claim 8 wherein,
    said manifold valve is enclosed by a protective cap that attaches to said manifold,
    (b) said manifold valve has a removeable control handle and
    (c) said manifold valve, manifold valve cap and manifold valve control handle are adapted so that said manifold valve control handle can be attached and removed from said manifold valve without removing said manifold valve cap from said manifold.

* * * * *